United States Patent [19]

Hahn et al.

[11] Patent Number: 5,024,115

[45] Date of Patent: Jun. 18, 1991

[54] SPINDLE DRIVE

[75] Inventors: Walter Hahn, Frankfurt; Ferdinand Lutz, Heppenheim; Manfred Jahn, Limeshain, all of Fed. Rep. of Germany

[73] Assignee: Asea Brown Boveri Aktiengesellschaft, Mannheim, Fed. Rep. of Germany

[21] Appl. No.: 511,624

[22] Filed: Apr. 20, 1990

[30] Foreign Application Priority Data

Apr. 21, 1989 [DE] Fed. Rep. of Germany ....... 3913080

[51] Int. Cl.[5] .............................................. F16H 27/00

[52] U.S. Cl. .................................................. 74/89.15

[58] Field of Search ......................... 74/89.15, 424.8 R

[56] References Cited

U.S. PATENT DOCUMENTS

| | | | |
|---|---|---|---|
| 3,147,766 | 9/1964 | Herring et al. | 74/89.15 X |
| 3,385,120 | 5/1968 | Nott | 74/89.15 X |
| 3,546,930 | 12/1970 | Flarsheim | 74/89.15 |
| 4,878,394 | 11/1989 | Nakamura et al. | 74/89.15 X |

FOREIGN PATENT DOCUMENTS

| | | | |
|---|---|---|---|
| 2134210 | 9/1984 | United Kingdom | 74/89.15 |

*Primary Examiner*—Allan D. Herrmann
*Assistant Examiner*—David W. Laub
*Attorney, Agent, or Firm*—Herbert L. Lerner; Laurence A. Greenberg

[57] ABSTRACT

A spindle drive for generating a rotational motion, in particular a drive for a high-voltage disconnecting switch, includes a drive shaft, at least one sliding block disk being mounted on the drive shaft and having recesses formed therein, two retaining bolts, a carriage in which the retaining bolts are fastened, a single slide nut for moving the carriage, and a drive spindle for moving the retaining bolts into engagement with the recesses. The drive spindle moves the retaining bolts through the slide nut and the carriage.

12 Claims, 2 Drawing Sheets

SPINDLE DRIVE

BACKGROUND OF THE INVENTION

1. Field of the Invention

The invention relates to a drive for producing a rotational motion, including a drive spindle with an axially movable slide nut mounted thereon, which engages a sliding block disk mounted on a drive shaft by means of guide bolts.

2. Description of the Related Art

Such a drive, which is known as a spindle-rotary sliding block unit, for actuating a high-voltage switchgear, is known from the 1981 publication A-ST 5064 D by Austrian Brown Boveri-Werke AG.

Summary of the Invention

In that device, the guide housing receiving the drive spindle is constructed as a welded structure. The spindle includes two spaced-apart slide nuts, which move axially to successively engage the sliding block disk with roller-reinforced retaining or slaving bolts thereof formed thereon and spaced apart on both sides, for rotating the sliding block disk. Such a construction requires high accuracy of fit of the parts engaging one another and therefore it is expensive. For instance, it necessitates providing both nuts with a precise, accurately spaced, turned thread, which means that they can only be used in sets.

It is accordingly an object of the invention to provide a spindle drive, which overcomes the hereinafore-mentioned disadvantages of the heretofore-known devices of this general type and which reduces the effort and cost of producing the spindle drive while assuring very reliable functioning.

With the foregoing and other objects in view there is provided, in accordance with the invention, a spindle drive for generating a rotational motion, especially a drive for a high-voltage disconnect switch, comprising a drive shaft, at least one sliding block or connecting link disk being mounted on the drive shaft and having recesses formed therein, two retaining bolts, a carriage in which the retaining bolts are fastened or fixed, only a single slide nut for moving the carriage, and a drive spindle for moving the retaining bolts through the slide nut and the carriage into engagement with the recesses.

Therefore, a single slide nut is mechanically firmly coupled to a carriage that in turn carries the guided, spaced-apart retaining bolts.

According to the invention, only a single, economical nut which is available on the market is usable as the slide nut and need only provide the forward drive. The retaining bolts are mounted and spaced apart by fixed distances on the guided carriage. The result is an improved course of motion, in which jamming of the individual slide nuts need not be feared. The optional equalization of play between the guided carriage and the slide nut also contributes to this effect. The slide nut is advantageously manipulable independently of the carriage and can be mounted therein with a certain amount of play.

Another advantage is the result of the fact that the retaining bolts are installed offset farther toward the drive shaft. An offset in which the longitudinal axes of the retaining bolts no longer intersect the drive spindle is advantageous and as a result continuous retaining bolts can be used in the carriage.

In accordance with another feature of the invention, the drive spindle has an axis, and the slide nut is manipulable independently of the carriage and is inserted into a recess formed in the carriage in a direction transverse to the drive spindle axis.

In accordance with a further feature of the invention, the retaining bolts are spaced apart by a fixed spacing, extend transversely relative to the drive spindle, are one-piece, and are moved past the drive spindle.

In accordance with an added feature of the invention, there is provided a guide housing in the form of an extruded profile section, preferably of an aluminum alloy, in which the retaining bolts are disposed.

In accordance with an additional feature of the invention, at least one of the carriage and/or the sliding block disk are made from an extruded profile section, preferably of an aluminum alloy.

A reduced manufacturing cost is also achieved by the use of extruded profile sections, particularly for the guide housing. However, both the carriage and the sliding block disk can also advantageously be formed from such profile sections.

In accordance with yet another feature of the invention, the carriage is a drop-forged part.

In accordance with a concomitant feature of the invention, the guide housing has lightweight profiles with longitudinal grooves formed therein defining running surfaces, and the lightweight profiles are mechanically fixed in place at ends and/or over the entire length thereof, for instance by means of stay bolts.

Other features which are considered as characteristic for the invention are set forth in the appended claims.

Although the invention is illustrated and described herein as embodied in a spindle drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Short Description of the Drawings

FIG. 1 is a fragmentary, diagrammatic, cross-sectional view of a guide housing of a drive as seen along a drive shaft; and FIG. 2 is a fragmentary, side-elevational view of the drive with the guide housing being omitted.

Description of the Preferred Embodiment

Figure 1:
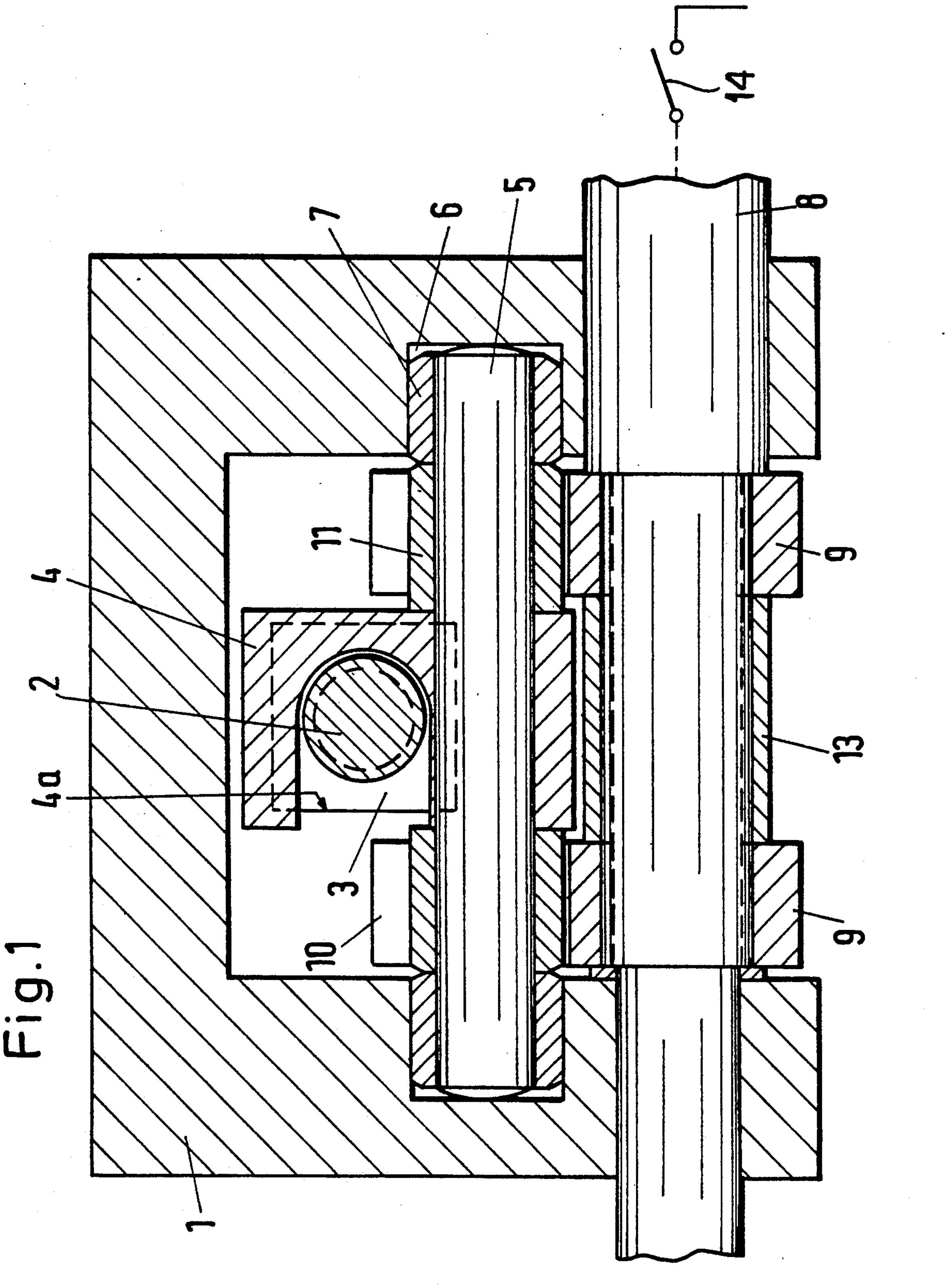

Referring now to the figures of the drawing in detail and first, particularly, to FIG. 1 thereof, there is seen a guide housing 1, which may be an extruded aluminum profile section, for instance, in which a drive spindle 2 is disposed. The drive spindle 2 is driven by a motor through a non- illustrated spur gear. A slide nut 3 is mounted on the drive spindle 2 and the slide nut and spindle are in form-locking connection through the thread. A form-locking connection is one which connects two elements together due to the shape of the elements themselves, as opposed to a force-locking connection, which locks the elements together by force external to the elements. If the drive spindle rotates, the slide nut 3 shifts along the drive spindle. The slide nut carries a carriage 4 along with it, which is slidable in the guide housing 1. For this purpose, the carriage 4 has a pocket or recess 4*a* formed therein, in which the slide nut 3 is insertable transversely to the forward direction. The sliding guidance of the carriage 4 is effected by means of slaving or retaining bolts 5, which pass through the carriage while being offset at a fixed distance from the drive spindle 2 and being reinforced with rollers (as indicated by roller sleeves 7) for engaging longitudinal grooves 6 formed in the guide housing on both sides. The guide housing has light-weight profiles in which the longitudinal grooves are formed defining running surfaces. The lightweight profiles are mechanically fixed in place at ends and/or over the entire length thereof. The single slide nut 3 thus only provides the forward drive and it can no longer jam. The sliding guidance is transmitted to the carriage.

Sliding block disks 9 are mounted on a drive shaft 8 on both sides of the carriage 4. The sliding block disks 9 have recesses 10 formed therein along a circular path, for the retaining bolts. The sliding of these parts is improved by means of rollers 11 that are slipped onto the retaining bolts 5.

Figure 2:
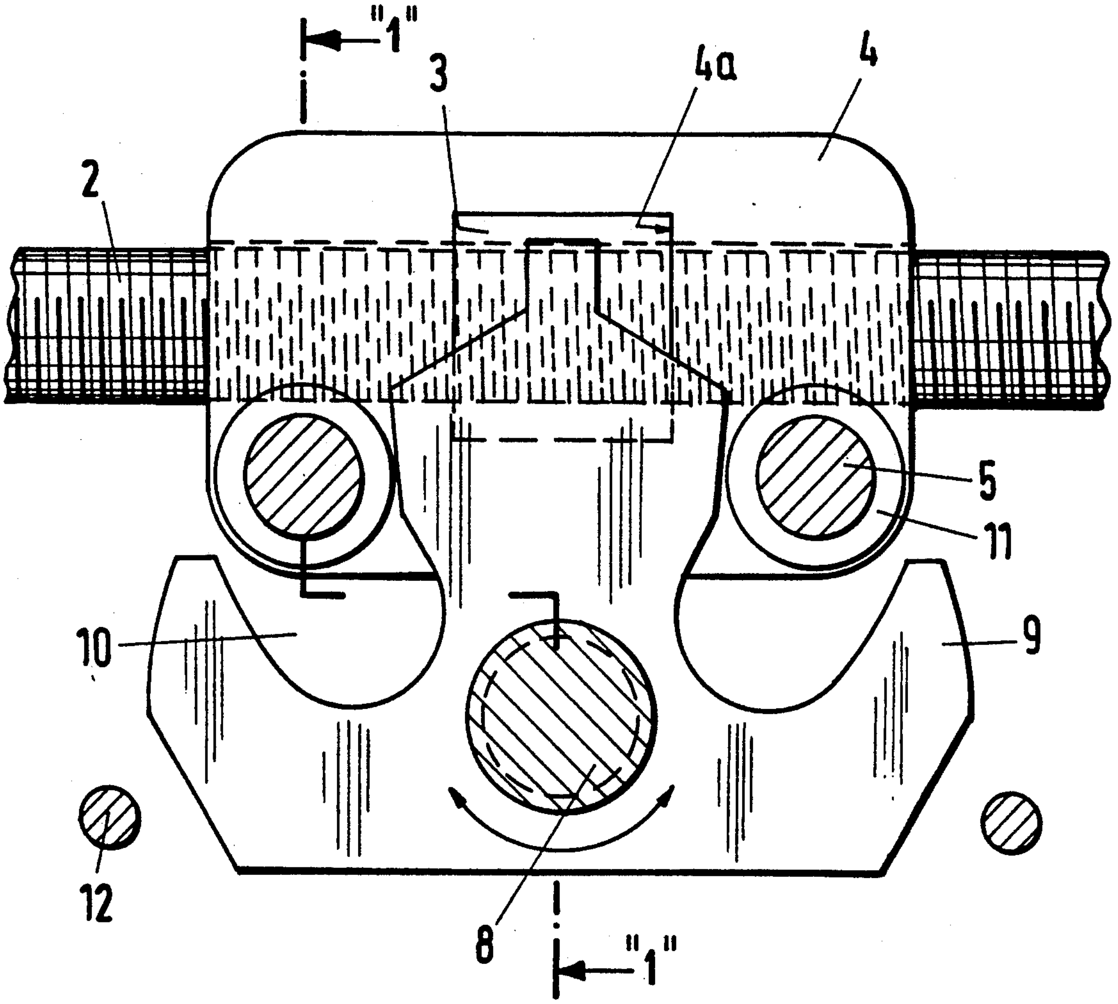

FIG. 2 shows the middle position of a sliding block disk 9, in which the retaining bolts 5 are located outside the recesses 10. If the drive spindle 2 is rotated, for instance in such a way that the slide nut 3 and the carriage 4 form-lockingly connected with it move to the right, then the retaining bolts 5 through their rollers 11, the sliding block disk 9 and thus the drive shaft 8 secured therein, are rotated clockwise. In this process the left retaining bolt 5 enters the recess 10 assigned thereto. In contrast, the recess on the right moves away from its retaining bolt. The course of motion is correspondingly reversed if the slide nut moves in the opposite direction. A rotational angle of 190° is, for instance, attainable with the drive mechanism.

Immediately before either end position is attained, the motor is gradually shut off by means of end switches. The sliding block disk 9 is constructed in such a way that with the motor still rotating in a terminal position, virtually no further motion is transmitted to the drive shaft. In addition, the sliding blocks 9 and thus the drive shaft are locked by stops 12. The kinetic energy of the parts which are still rotating after the stoppage of the motor is braked, such as by means of non-illustrated cup spring assemblies disposed on the ends of the drive spindle.

As can be seen from FIG. 1, in the exemplary embodiment two sliding block disks 9 are firmly mounted on the drive shaft 8 in order to transmit major torque. The sliding block disks are kept spaced apart by a spacer bushing 13 mounted on the drive shaft.

An essential feature of the invention is that it need not necessarily have two slide nuts with integrally formed-on retaining tangs thereof. Instead, it is possible to keep the retaining bolts at a fixed spacing on the carriage independently of the single slide nut. For a more-compact shape of the sliding block disks 9, it is advantageous if the plane of the axial centers of the retaining bolts 5 is offset toward the center plane of the drive shaft 8. The bolts which are advantageously one-piece, can be moved past the drive spindle 2 and the two end pieces thereof can perform the guide or motion function.

We claim:

1. Spindle drive for generating a rotational motion, comprising a drive shaft, at least one sliding block disk being mounted on said drive shaft and having recesses formed therein, two retaining bolts, a carriage in which said retaining bolts are fastened, a single slide nut for moving said carriage, and a drive spindle for moving said retaining bolts through said slide nut and said carriage into engagement with said recesses.

2. Drive according to claim 1, wherein said drive spindle has an axis, and said slide nut is manipulable independently of said carriage and is inserted into a recess formed in said carriage in a direction transverse to said drive spindle axis.

3. Drive according to claim 1, wherein said retaining bolts are spaced apart by a fixed spacing, extend transversely relative to said drive spindle, are moved past said drive spindle, and each of said bolts is a one-piece bolt.

4. Drive according to claim 1, including a guide housing in the form of an extruded profile section in which said retaining bolts are disposed.

5. Drive according to claim 1, including a guide housing in the form of an extruded aluminum alloy profile section in which said retaining bolts are disposed.

6. Drive according to claim 1, wherein at least one of said carriage and said sliding block disk are made from an extruded profile section.

7. Drive according to claim 1, wherein at least one of said carriage and said sliding block disk are made from an aluminum alloy extruded profile section.

8. Drive according to claim 1, wherein said carriage is a drop-forged part.

9. Drive according to claim 4, wherein said guide housing has lightweight profiles with longitudinal grooves formed therein defining running surfaces.

10. Drive according to claim 9, wherein said lightweight profiles are mechanically fixed in place at ends thereof.

11. Drive according to claim 9, wherein said lightweight profiles are mechanically fixed in place over the entire length thereof.

12. Spindle drive for a high-voltage disconnecting switch, comprising a drive shaft, at least one sliding block disk being mounted on said drive shaft and having recesses formed therein, two retaining bolts, a carriage in which said retaining bolts are fastened, a single slide nut for moving said carriage, and a drive spindle for moving said retaining bolts through said slide nut and said carriage into engagement with said recesses.

* * * * *